United States Patent
Gaonkar et al.

(10) Patent No.: US 9,886,398 B2
(45) Date of Patent: Feb. 6, 2018

(54) IMPLICIT SHARING IN STORAGE MANAGEMENT

(71) Applicant: International Business Machines Corporation, Armonk, NY (US)

(72) Inventors: Chetan L. Gaonkar, Kumta (IN); Keerthi B. Kumar, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 106 days.

(21) Appl. No.: 14/955,150

(22) Filed: Dec. 1, 2015

(65) Prior Publication Data

US 2017/0153987 A1 Jun. 1, 2017

(51) Int. Cl.
| | |
|---|---|
| G06F 3/06 | (2006.01) |
| G06F 12/02 | (2006.01) |
| G06F 9/455 | (2006.01) |
| G06F 12/14 | (2006.01) |
| G06F 12/1009 | (2016.01) |

(52) U.S. Cl.
CPC .......... G06F 12/145 (2013.01); G06F 3/0608 (2013.01); G06F 9/45558 (2013.01); G06F 12/0284 (2013.01); G06F 12/1009 (2013.01); G06F 2009/45583 (2013.01); G06F 2212/152 (2013.01)

(58) Field of Classification Search
CPC .................. G06F 3/0608; G06F 3/064; G06F 2009/45583; G06F 11/08; G06F 12/1009; G06F 12/10; G06F 12/023; G06F 12/0284
See application file for complete search history.

(56) References Cited

U.S. PATENT DOCUMENTS

| | | | |
|---|---|---|---|
| 8,423,733 B1* | 4/2013 | Ozdemir | G06F 3/0604 711/162 |
| 8,935,506 B1 | 1/2015 | Gopalan | |
| 9,063,866 B1 | 6/2015 | Tati et al. | |
| 9,501,421 B1* | 11/2016 | Cheriton | G06F 12/10 |
| 2014/0208007 A1* | 7/2014 | Cohen | G06F 3/0608 711/103 |
| 2015/0067390 A1 | 3/2015 | Blake | |
| 2015/0248237 A1* | 9/2015 | Tsirkin | G06F 3/061 711/162 |
| 2017/0046185 A1* | 2/2017 | Tsirkin | G06F 9/45558 |

OTHER PUBLICATIONS

Mell et al., "The NIST Definition of Cloud Computing," National Institute of Standards and Technology, U.S. Department of Commerce, Special Publication 800-145, Sep. 2011, 7 pages.

* cited by examiner

*Primary Examiner* — Hal Schnee
(74) *Attorney, Agent, or Firm* — Peter J. Edwards (57) ABSTRACT

A physical address of a page may be identified. A first process that implements copy-on-read techniques for the page may be detected. A determination may be made that the first process is not expected to write to the page. In response to that determination, a different logical address may be established for the first process for the page from the logical address of a second process for the page, but the two logical addresses may be mapped to the same physical page.

20 Claims, 6 Drawing Sheets

IMPLICIT SHARING IN STORAGE MANAGEMENT

BACKGROUND

The present disclosure relates to computer storage management, and more specifically, to sharing and copying of data between processes.

Storage-management systems typically follow use copy-on-read or copy-on-write techniques to share data, such as in pages, between processes. Copy-on-read techniques involve copying a page for a process when it is first referenced by that process. Copy-on-write techniques involve copying a page for a process when it is first written to by that process.

SUMMARY

Some embodiments of the disclosure can be illustrated by a method, system, or computer program product. In the method, system, or computer program product, a physical address of a page may be identified. A first process that implements copy-on-read techniques for the page may be detected. A determination may be made that the first process is not expected to write to the page. In response to that determination, a different logical address may be established for the first process for the page from the logical address of a second process for the page, but the two logical addresses may be mapped to the same physical page.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer storage management; more particular aspects relate to sharing and copying of data between processes. While the present disclosure is not necessarily limited to such applications, various aspects of the disclosure may be appreciated through a discussion of various examples using this context.

Typical computer storage-management systems use various techniques to maximize the amount of storage available to the computer processor and ensure the data most directly accessible by the processor is the data most frequently used by the processor. A computer may use various storage elements, which may include primary storage elements. Primary storage may be a volatile storage medium, such as registers, caches, and random-access memory (RAM), among others, and is directly accessible by the processor. In systems utilizing virtual-memory techniques, primary storage, as used herein, may also refer to the portions of a secondary-storage unit (such as a hard disk, solid state drive, or magnetic tape) that have been reserved for the primary-storage paging space.

Storage-management systems may utilize organizational strategies such as paging. In paging, information is stored in same-size blocks that are referred to as pages. Pages may be contained within primary storage at addresses that correspond to intervals of those same-size blocks. For example, if the page size in a system were 1,000 bytes, the beginning address of the first, second, and third non-compressed pages in primary storage may be 0, 1,000, and 2,000, respectively.

These addresses, referred to as physical addresses, are tracked by a storage-management unit. A storage-management unit is a computer hardware or software unit, or a combination of both, through which primary-storage references pass. It may take the form of an integrated circuit that is separate from a system's main processor, or may be implemented as part of the main processor. It may also take the form of a hypervisor, an operating system, or a module of either a hypervisor or operating system. In some instances a storage-management unit, as used herein, may actually be composed of multiple components, whether hardware, software, or both. In some such instances the components may act in response to or in coordination with each other, may act independently for related or different purposes, or a combination of both. Regardless of the form they take, storage-management units, as used herein, are typically responsible for managing activities that affect primary storage. These activities may include paging, primary-storage protection, organization of data within primary storage, copying pages, determining the permissions of processes to read from and write to pages, and determining the storage-related configurations of processes, pages, and segments.

Computer operations are typically executed by processes. A process may be, for example, an operating system, an application, or a hypervisor. In order for a process to execute an operation, the process may require instructions from primary storage (i.e., it may read from primary storage), and may store data in primary storage (i.e., it may write to primary storage) as a result of its operations. If the computer system in which the process is running utilizes paging, the primary storage that the process may access may be located in one or more pages. In typical cases these pages will be given a physical address, which is the location of the page in memory. The physical address of a page may be used by a storage-management unit to map a process' operations to a page in primary storage. When a process references a page, either reading from or writing to, the process may be given a logical address, sometimes referred to as a virtual address, for that page. The storage-management unit may keep track of those logical addresses in a table that maps the logical addresses of each process to the physical addresses of the corresponding pages. In this way, when a process requests access to a page using that process' logical address, the storage-management unit ensures that the process is given access to the correct page.

In some storage-management systems, multiple processes may share the same copy of a page. One type of page sharing technique is referred to as implicit sharing. In implicit sharing, a page used by a process is not copied until the process attempts to write to the page (i.e., copy on write, or "COW"). In COW, multiple processes may initially be given the same logical address for the page, which may map to the same physical address of the page. When one of those processes attempts to write to the page, the process is halted while a unique copy of the page can be created for the process. In these instances COW techniques free up the primary storage space that would be necessary to create a copy of the shared page for each process that may use it, and only consumes that primary storage when and to the extent that it is needed.

COW techniques may be particularly useful to save primary storage space in instances in which multiple processes read from the same page, but do not alter it. However, COW, if used widely, can lead to system delays. This is because the process that attempts to write to a shared page must be stalled not only to copy the page, but to update the information stored in the storage-management unit's table to account for, for example, the physical address of the new page, the new logical address to map to that physical address, and the change of the process' permissions for the page from read only to read-write. This stalling due to table updating is referred to as a protection fault. Some instances of copying may also involve page faults, i.e., time wasted due to relocating data from secondary storage (such as a hard disk, solid state drive, or magnetic tape) to primary storage, in addition to protection faults. These relocated data may be related to tables that keep track of the storage segment on which the page is located and that may be needed for address translation (e.g., a segment control block and external-page-table targets), for example. Such relocations increase the amount of time the process must be stalled.

When performed for a single page for a single process, these delays may not lead to significant system stalling. If, for example, a process were to write to a high percentage of pages as the first reference to those pages, or if it were to read from and never write to a high percentage of pages, relatively few protection faults may occur. However, in some instances a process may read from and then write to relatively many pages in a relatively short amount of time, such as on process creation. In these instances the computer system on which the process is located may be significantly delayed, as each time a page is read by a process, addresses and permissions are typically established for that page. Then, when the page is written to, those addresses and permissions must typically be updated in a protection fault. These delays may be more significant if multiple such processes write to many pages in a short amount of time. In these instances COW may be sub-optimal. In an alternative technique, a page used by a process is copied once the process reads the page (i.e., copy on read, or "COR"). COR typically creates a copy of a page for a process when the process first references the page, either by reading from or writing to the page. This created copy is dedicated to the referencing process before address information and permissions are established for the page, which prevents a protection fault when that address information and those permissions are established. Thus, COR may be faster than COW in many applications.

However, typical systems do not have sufficient primary storage to make use of COR for all pages for all processes; if all pages for all processes utilized COR, each process would have its own copy of every page from which that process has read, which would require excessive amounts of primary storage in most computer systems. In order to mitigate this storage problem when utilizing COR, computer storage systems may restrict the use of COR to only certain processes or certain blocks of primary storage in which the pages referenced by processes are located. For example, the configuration of a process may be determined when it is created by a system fork operation. If that process has been configured to utilize COR, a copy of every page referenced (i.e., either read from or written to) by that process may be created for that process upon being referenced. If that process has been configured to utilize COW, however, a page will not be copied for that process until the process writes to the page. If a storage-management system determines whether to utilize COR or COW based on the block in which a page is located, the configurations of any particular process may not determine whether the process uses COR or COW when referencing pages. Instead, each process may use COR for the pages in a storage block configured for COR, but COW for pages in a storage block configured for COW.

Whether a computer system determines to use COR or COW on a process level or a block level, many pages may be copied under COR that may never be written to, and many pages may be copied under COW that may be read from and written to shortly after process creation. Thus, system delays and primary storage issues may still exist.

In some embodiments, the systems and methods of the present disclosure may improve upon implicit sharing by, for example, altering COR techniques to incorporate COW techniques for some pages. When a process is created, the storage-management unit may determine whether the process is configured for COR or COW. If COR, the storage-management unit may determine which pages that the process references that will be treated as standard COR pages and which pages that the process references that will be treated as modified COR pages. This may be based on a per-process basis or a per-block basis.

Figure 1:
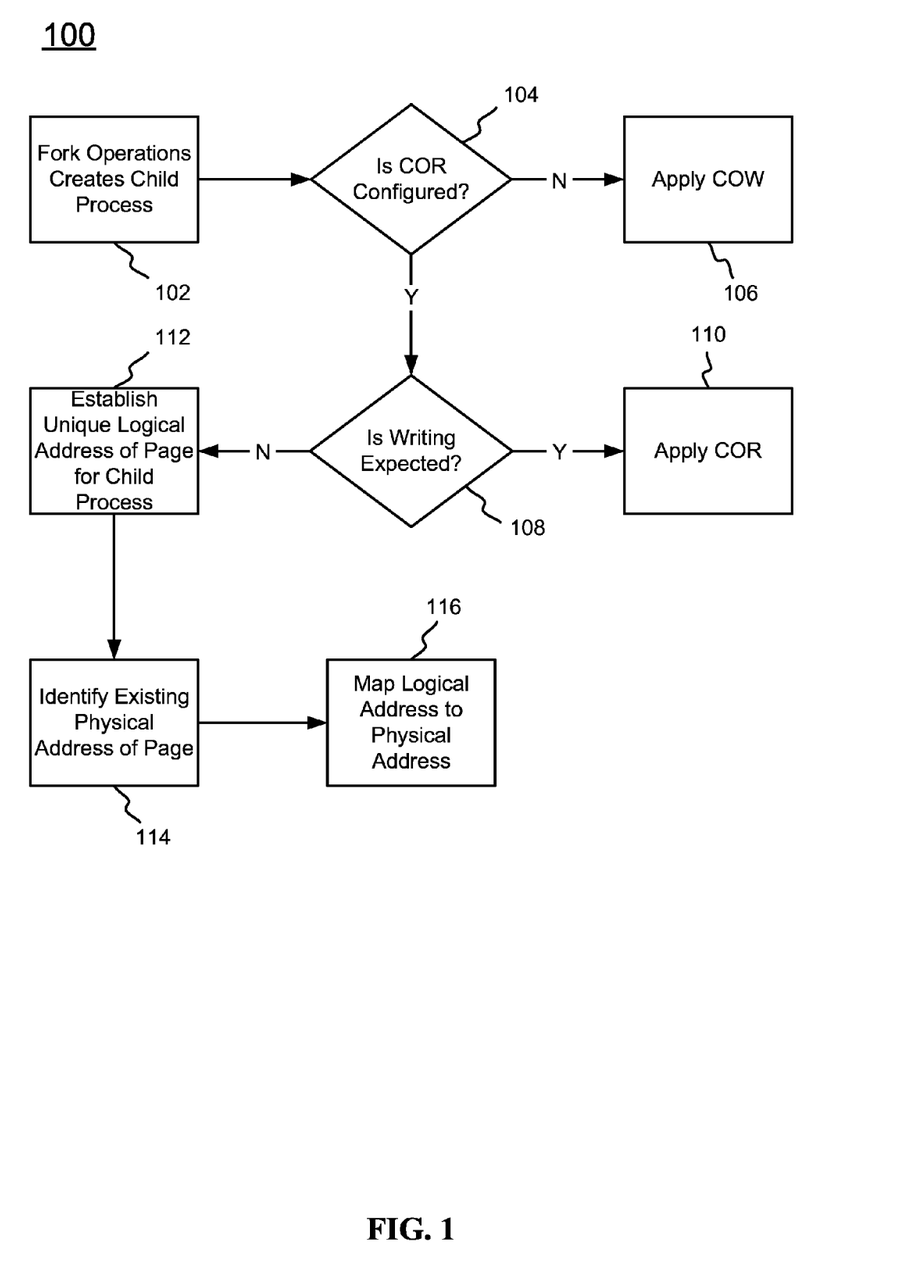
FIG. 1 depicts a logic-flow diagram illustrating a method 100 of altering COR techniques in accordance with embodiments.

FIG. 1 depicts a logic-flow diagram illustrating a method 100 of altering COR techniques in accordance with embodiments. In block 102, a child process is created in a system fork operation. Upon creation of the process, a storage-management unit determines in 104 whether and the extent to which COR is configured to be implemented for that process. In some embodiments this may take the form of identifying configurations set for the process, i.e., identifying whether the process is configured to receive a unique copy of each page upon reading from the page. In other embodiments it may take the form of identifying configurations set for one or more storage blocks (e.g., all storage blocks, only the storage blocks the process is expected to reference before the process is terminated, only the storage block the process is currently referencing). Specifically, this may include identifying whether the pages in those one or more blocks are configured to be copied for any particular process once that particular process references the page.

If the storage-management unit determines that COW, not COR, is configured, the storage-management unit applies COW in 106 to pages referenced by the process or for that block. If COR is configured, the storage-management unit determines in 108 whether the process is expected to write to the page before the process is terminated. If writing is expected, the storage-management unit applies COR in 110. Whether writing is expected may be determined with varying levels of certainty. Writing expectation may be certain, for example, if the process is configured in such a way that it will write to the page immediately after reading from it. Writing may be expected to a certain degree, for example, if a process writes to a page when a file is opened by a human user of the system on which the process is running. In that case, the pattern of how often the file is opened would affect the determination, but the expectation may not be certain.

In some embodiments, the application of COR may involve an absolute determination (e.g., COR would be applied unless it is certain that the process will not write to the page). In other embodiments this may involve a threshold determination (e.g., COR would be applied unless there was at least an 80% chance that the page would not be written to). If the storage-management unit determines in 108 that the process is not expected to write to the page, it would apply a modified implementation of COR that resembles aspects of COW. In this modified implementation, a copy would not be created upon the process reading the page. Instead, the process would share a copy of the page with at least one other page, similar to COW. However, unlike COW, the process would be given a unique copy of a logical address of the page in 112. This may involve, for example, the storage-management unit establishing a new page logical address in the same way the storage-management unit would have established a new logical address for a process for a new page, had a new page been created. No new page is created in 112, however, and thus the new logical address cannot be mapped to a new page. Instead, in 114 the storage-management unit identifies the physical address of the already existing page that the processes will be sharing. The storage-management unit maps the new logical address to the existing physical address in 116. As a result both the newly created child process and a second process may be sharing the same page, but because the logical addresses for each process is different, it may appear that each process is using a separate copy of the same page, as in COR. However, as in COW, unnecessary duplication of data in primary storage may be prevented.

In some embodiments of the method, modified COR may be utilized for all attempted implementations of COR. In such embodiments, 108 and 110 of FIG. 1 may be unnecessary. Specifically, in such embodiments, if a storage-management unit determined that COR was configured in 104, the storage-management unit would proceed directly to 112, rather than 108.

In some embodiments it may be beneficial for some components of a computer system to be unaware of the modified implementation of COR. For example, a component of a storage-management system may be configured to detect whether all processes that are configured to use COR are indeed using COR. In these embodiments it may be beneficial for that component to only be given visibility to the logical addresses of the processes, so it appears from the component's perspective that, because each process for which COR and modified COR has a unique logical address for a COR page, each process also has a unique copy of the COR page. However, a second component of the storage-management system may be configured to map logical addresses to physical addresses, and from that component's perspective it would be clear that, for some pages, modified COR has been be implemented.

Figure 2:
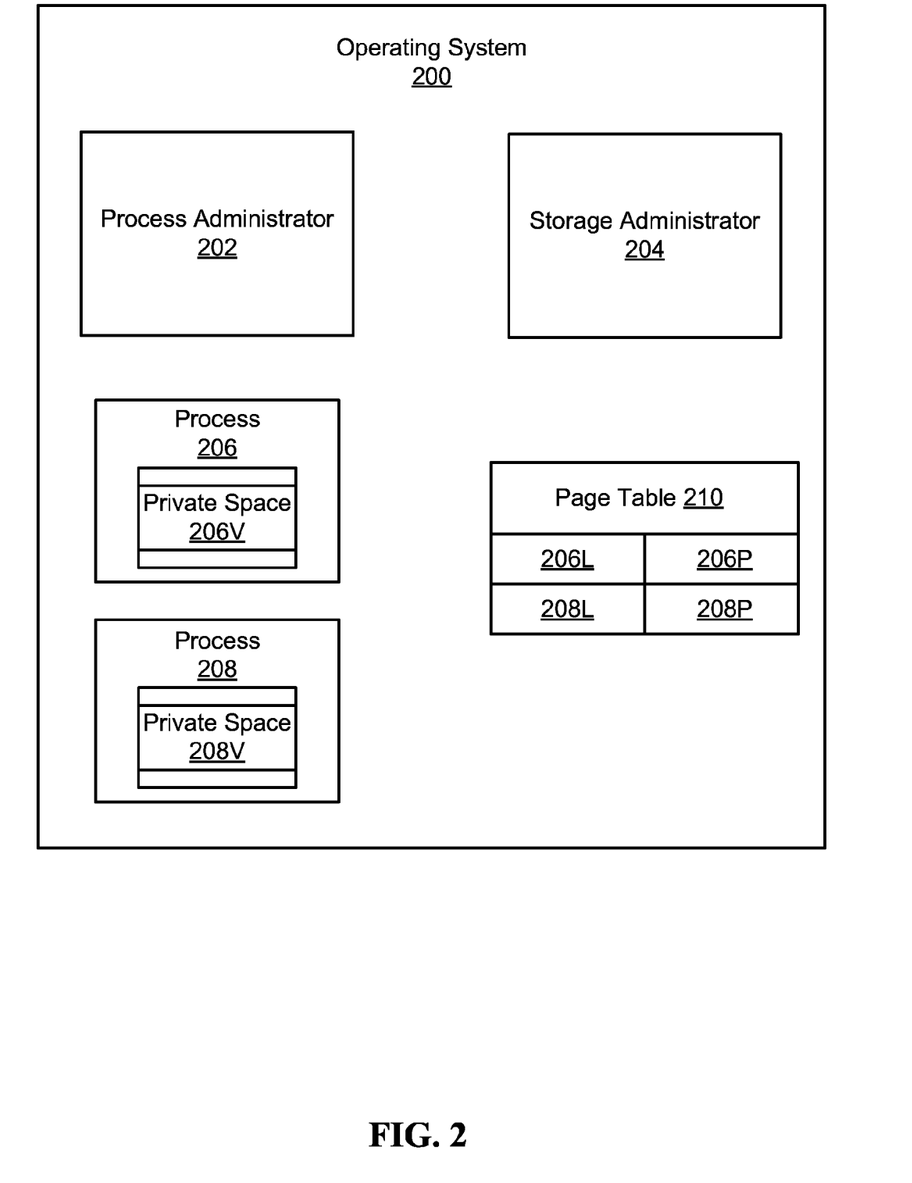
FIG. 2 illustrates an example of a computer system that may implement a modified COR and in which a component may be unaware of the modified COR implementation in accordance with embodiments.

FIG. 2 illustrates an example of a computer system that may implement a modified COR and in which a component may be unaware of the modified COR implementation. The system is run by Operating System 200. In some embodiments Operating System 200 may be considered or contain a storage-management unit, while in other embodiments Operating System 200 may be the software that a storage-management unit (e.g., a hypervisor or integrated circuit) may direct to perform some or all storage-management functions. Operating System 200 contains Process Administrator 202 and Processes 206 and 208. In some embodiments Process 206 and Process 208 may be child processes of the same parent process or of different parent processes, or one of Processes 206 and 208 may be the parent process of the other. Process 206 contains Private Space 206V, which is a table that lists the logical addresses assigned to Process 206 for the pages Process 206 is using. Similarly, Process 208 contains Private Space 208V, which lists the corresponding logical addresses assigned to Process 208. In this embodiment Operating System 200 delegates to Process Administrator 202 the functions of detecting page references by Processes 206 and 208, detecting whether the COR or COW sharing method is to be implemented for those references, detecting whether the appropriate sharing method is implemented, and maintaining Private Spaces 206V and 208V.

Operating System 200 also contains Storage Administrator 204 and Page Table 210. Page Table 210 contains, as presented, four cells (206L, 206P, 208L, and 208P) that hold a listing of the logical addresses and corresponding physical addresses of the pages referenced by Processes 206 and 208. In this embodiment Operating System 200 delegates to Storage Administrator 204 the functions of maintaining Page Table 210. The first row of Page Table 210, as presented, contains information pertaining to Process 206; Cell 206L contains the logical address of a page referenced by Process 206 and Cell 206P contains the corresponding physical address. The second row of Page Table 210, as presented, contains information pertaining to Process 208; Cell 208L contains the logical address of a page referenced by Process 208 and Cell 208P contains the corresponding physical address.

In FIG. 2, COR may be implemented for Process 206 and Process 208 for a page read by both processes. Private Space 206V, Private Space 208V, and the two rows of Page Table 210 may hold address information related to that page. As presented, then, Private Space 206V and Cell 206L would hold a different logical address from Private Space 208V and Cell 208L. Similarly, Cell 206P would hold a different physical addresses from Cell 208P. Both of these differences would be due to the fact that Process 206 and Process 208 each would have a unique copy of that page. If a modified COR were implemented for Process 206 and Process 208 for a page read by each process, Private Space 206V and Cell 206L would still hold a different logical address from Private Space 208V and cell 208L. However, Cell 206P and Cell 208P would hold the same physical address. This is due to the fact that, while Process 206 and 208 would be given unique logical addresses for the page, as in COR, both processes would be sharing the same data of the same page at the same physical address.

Because Process Administrator 202 functions to ensure that both Process 206 and Process 208 are using the proper sharing technique, it may be beneficial for Process Administrator 202 to be denied access to the contents of Cells 206P and 208P. In some embodiments this may be accomplished by restricting access to those individual cells, to the column or rows containing those cells, or to Page Table 210 in its entirety. Because Process Administrator 202 would then be aware that Process 206 and Process 208 had different logical addresses for the page, it would appear that Process 206 and Process 208 were using COR. However, Storage Administrator 204 would know, due to its access to and maintenance of Page Table 210, that a modified COR had been implemented for the page. Storage Administrator 204 may inform Operating System 200 of the modified COR mapping as well.

Figure 3:
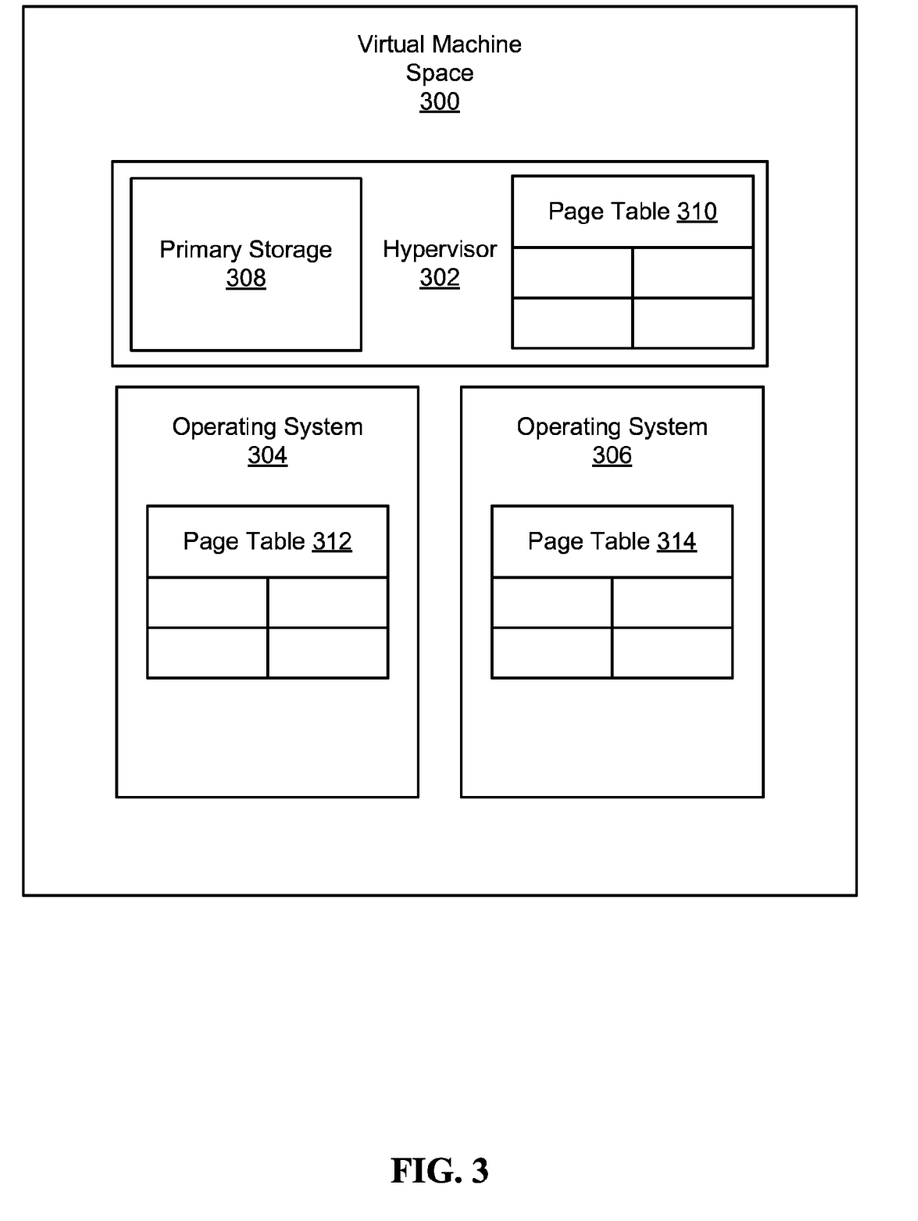
FIG. 3 illustrates an example of a computer system in which a hypervisor could direct a modified COR implementation in accordance with embodiments.

FIG. 3 illustrates an example of a computer system in which a hypervisor could direct a modified COR implementation. Virtual Machine Space 300 contains Hypervisor 302, which runs Operating Systems 304 and 306. In some embodiments Hypervisor 302 may take the form of software, in others it may take the form of hardware, and in some embodiments it may be a combination of hardware and software. Virtual Machine Space 300 contains Primary Storage 308, which provides the physical primary storage for Hypervisor 302, Operating System 304, and Operating System 306. Hypervisor 302, acting as a storage-management unit, may maintain Primary Storage 308 and Page Table 310. Page Table 310 contains a list, for all operating systems in Virtual Machine Space 300, of the pages in Primary Storage 308 to which the operating system has access, the logical address of that page assigned to the operating system, and the physical address of the page in Primary Storage 308. Operating Systems 304 and 306, acting as processes, access pages located in Primary Storage 308 through calling Hypervisor 302. If Operating System 304 and Operating System 306 both access a page for which Hypervisor 302 determines that modified COR should be implemented, Hypervisor 302 may assign Operating System 304 and Operating System 306 separate logical addresses, while mapping them to the same physical address in Page Table 310. Hypervisor 302 may implement modified COR, for example, if each operating system is requesting its own copy of kernel files, but neither operating system has permissions to modify the information in the files.

Operating System 304 and Operating System 306 each contain their own page tables, represented here by Page Table 312 and Page Table 314. These page tables may be used to track the pages referenced by the operating system from Primary Storage 308, but may or may not be unaware of the actual physical addresses of those pages. These page tables may also track the pages referenced by the child processes of Operating System 304 and Operating System 306. In some embodiments Operating Systems 304 and 306 may be unaware of the modified COR implemented by Hypervisor 302, whereas in other embodiments Operating Systems 304 and 306 may have visibility to the implementation. In some embodiments, for example, Operating Systems 304 and 306 may contain child processes that have been configured to use COR, but are requesting pages they will not modify. These may be pages, for example, that only one process in an operating system typically has permission to reference, but does not have permission to modify. In a standalone operating system with dedicated primary storage, such a process may be given its own copy of such a page because no other process would be able to access it. However, as Operating Systems 304 and 306 share Primary Storage 308, such child processes of Operating Systems 304 and 306 may each access such a page. However, since neither child process could write to the page, duplication of the page would not be necessary. In this example Operating System 304 and 306, or a storage-management unit within each operating system, may request access to the page for the child processes through a hypervisor call. If the Operating Systems 304 and 306 are aware that they are operating within a space shared by other operating systems, they may be aware of the need for modified COR implementation. In this case, the hypervisor call may specify that, even though COR is requested, Hypervisor 302 should map the logical address to a shared physical address. However, in some embodiments Operating System 304 or Operating System 306 may be unaware of the presence of the shared space, and may request standard COR in the hypervisor call.

In some embodiments of the disclosure, the page referenced by a child process may not be present in primary storage. In this case the page fault handler of a storage-management unit may be invoked to handle the page fault. The storage-management unit may access the segment corresponding to the page and determine the nature of the segment. If the segment is a working storage segment, the storage-management unit may access the corresponding extended page table (XPT) root pointer to identify the XPT direct blocks and XPT indirect blocks (i.e., the XPT entry that maps to that page). If the XPT state is "COR," the page may need to be copied for the child process.

In some embodiments of the disclosure, a dummy segment may be created in a fork tree when the fork system call is requested to create a child process. This dummy segment may be a segment of primary storage that is shared by both the newly created child process, the child's parent process, and potentially other children of that parent or the child. The parent segment and child segment may each have their own segment "under" the dummy segment, which may correspond to the parent and child's actual segments of data in primary storage. After the system fork, all pages of the parent that are accessible by the child but for which writing is not expected are transferred to the dummy segment. If either the parent process or the child process attempts to read a page in this dummy segment, the storage-management unit may search that parent or child's segment for the page. If the page is not present, but COR is requested by the process or storage-block configurations, the page in the dummy segment is given two logical addresses that differ from each other. One logical address is moved to the parent segment, and one logical address is created for the child segment. However, the storage-management unit notes that the two logical addresses map to the same physical page by mapping them to the same physical address.

Figure 4:
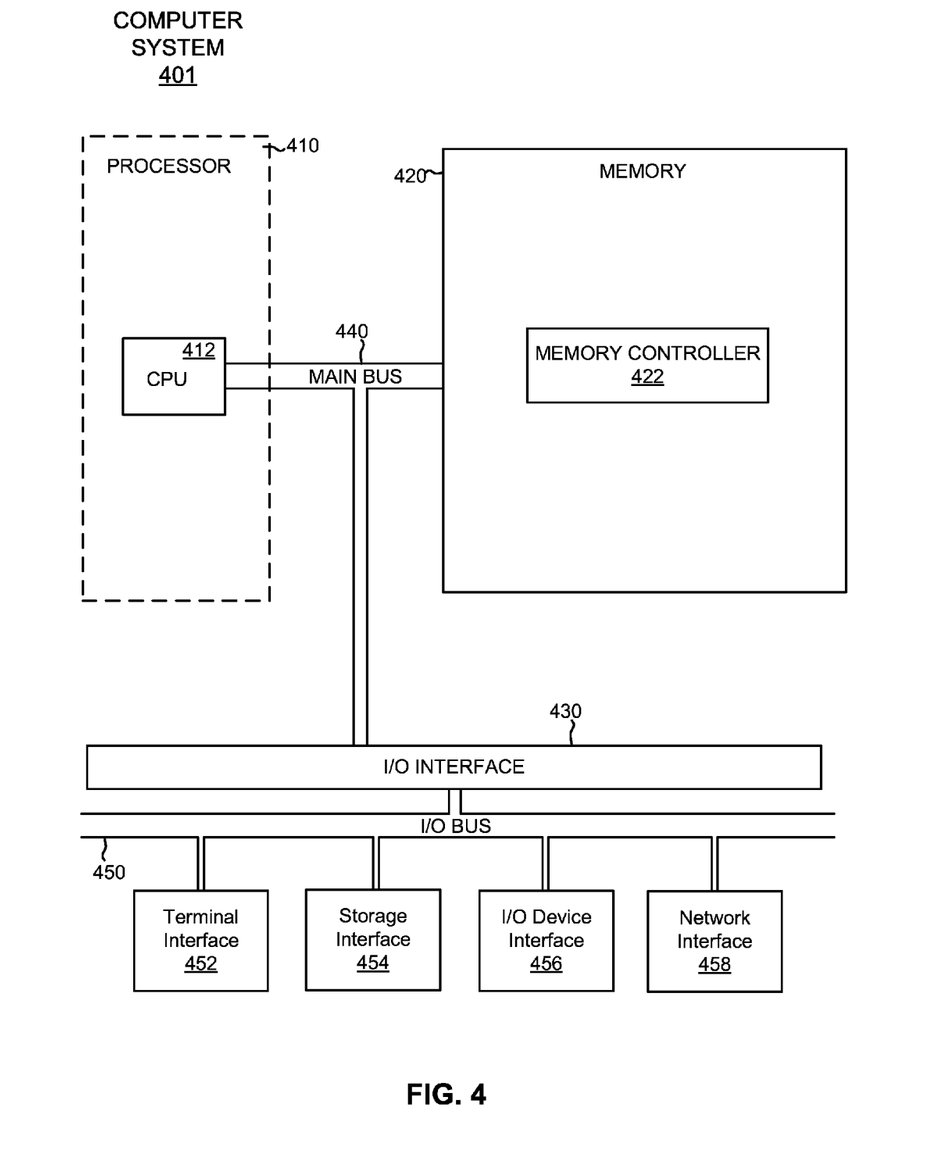
FIG. 4 depicts the representative major components of an example Computer System 401 that may be used in accordance with embodiments.

FIG. 4 depicts the representative major components of an example Computer System 401 that may be used in accordance with embodiments of the present disclosure. The particular components depicted are presented for the purpose of example only and are not necessarily the only such variations. The Computer System 401 may comprise a Processor 410, Memory 420, an Input/Output Interface (also referred to herein as I/O or I/O Interface) 430, and a Main Bus 440. The Main Bus 440 may provide communication pathways for the other components of the Computer System 401. In some embodiments, the Main Bus 440 may connect to other components such as a specialized digital signal processor (not depicted).

The Processor 410 of the Computer System 401 may be comprised of one or more CPUs 412. The Processor 410 may additionally be comprised of one or more memory buffers or caches (not depicted) that provide temporary storage of instructions and data for the CPU 412. The CPU 412 may perform instructions on input provided from the caches or from the Memory 420 and output the result to caches or the Memory 420. The CPU 412 may be comprised of one or more circuits configured to perform one or methods consistent with embodiments of the present disclosure. In some embodiments, the Computer System 401 may contain multiple Processors 410 typical of a relatively large system. In other embodiments, however, the Computer System 401 may be a single processor with a singular CPU 412.

The Memory 420 of the Computer System 401 may be comprised of a Memory Controller 422 and one or more memory modules for temporarily or permanently storing data (not depicted). In some embodiments, the Memory 420 may comprise a random-access semiconductor memory, storage device, or storage medium (either volatile or non-volatile) for storing data and programs. The Memory Controller 422 may communicate with the Processor 410, facilitating storage and retrieval of information in the memory modules. The Memory Controller 422 may communicate with the I/O Interface 430, facilitating storage and retrieval of input or output in the memory modules. In some embodiments, the memory modules may be dual in-line memory modules.

The I/O Interface 430 may comprise an I/O Bus 450, a Terminal Interface 452, a Storage Interface 454, an I/O Device Interface 456, and a Network Interface 458. The I/O Interface 430 may connect the Main Bus 440 to the I/O Bus 450. The I/O Interface 430 may direct instructions and data from the Processor 410 and Memory 420 to the various interfaces of the I/O Bus 450. The I/O Interface 430 may also direct instructions and data from the various interfaces of the I/O Bus 450 to the Processor 410 and Memory 420. The various interfaces may comprise the Terminal Interface 452, the Storage Interface 454, the I/O Device Interface 456, and the Network Interface 458. In some embodiments, the various interfaces may comprise a subset of the aforementioned interfaces (e.g., an embedded computer system in an industrial application may not include the Terminal Interface 452 and the Storage Interface 454).

Logic modules throughout the Computer System 401—including but not limited to the Memory 420, the Processor 410, and the I/O Interface 430—may communicate failures and changes to one or more components to a hypervisor or operating system (not depicted). The hypervisor or the operating system may allocate the various resources available in the Computer System 401 and track the location of data in Memory 420 and of processes assigned to various CPUs 412. In embodiments that combine or rearrange elements, aspects of the logic modules' capabilities may be combined or redistributed. These variations would be apparent to one skilled in the art.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
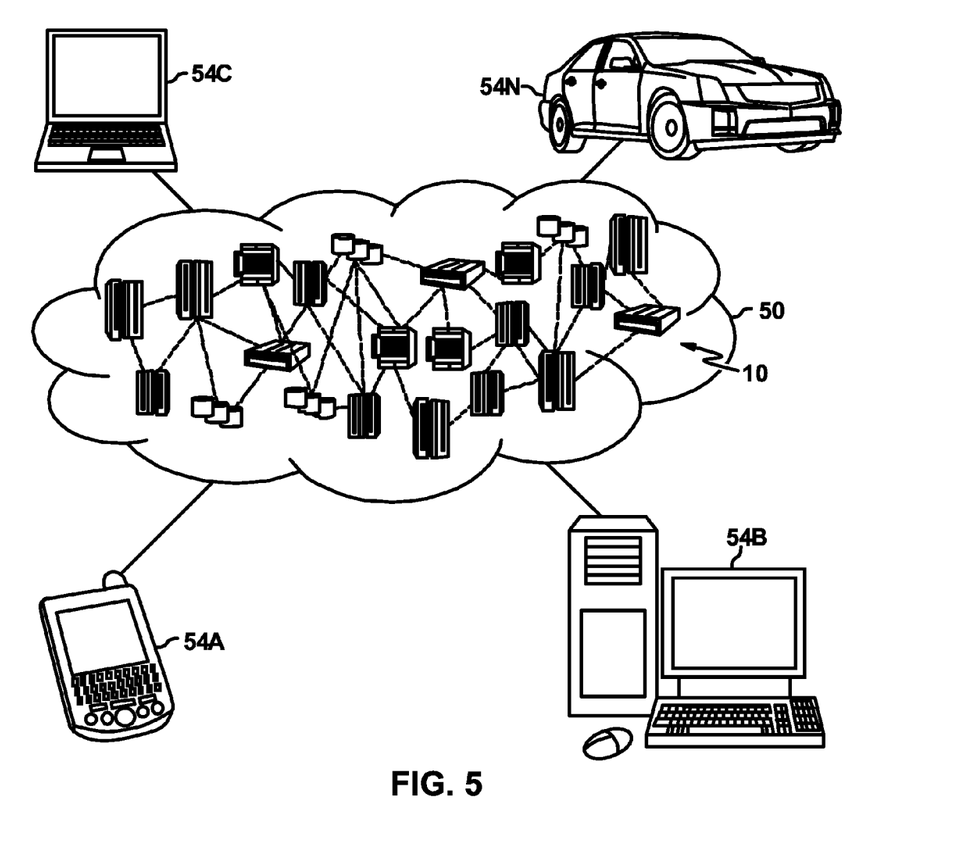
FIG. 5 depicts the representative major components of an example cloud-computing environment that may be used in accordance with embodiments.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
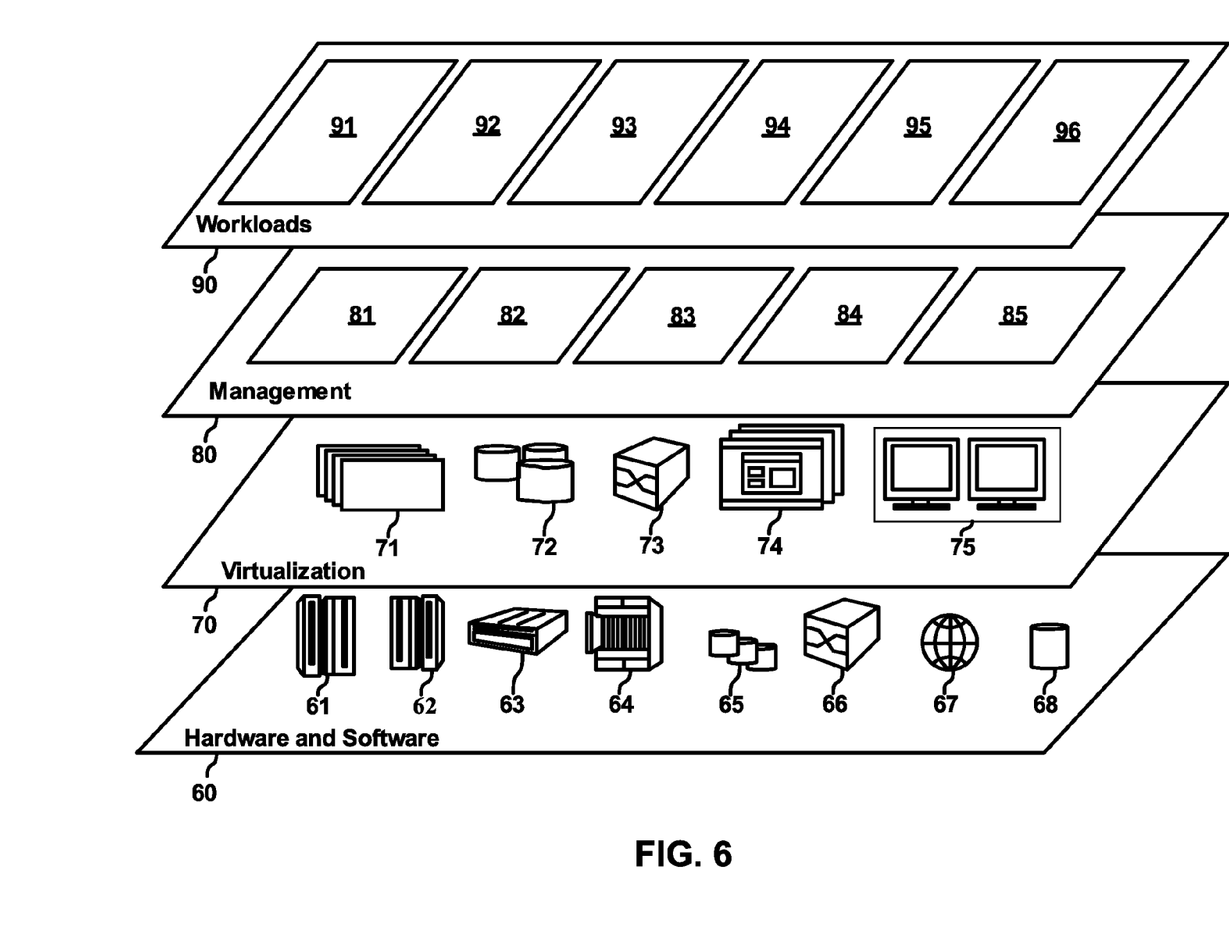
FIG. 6 depicts abstraction model layers according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions that may be provided from this layer include: mapping and navigation 91; software development and lifecycle management 92; virtual classroom education delivery 93; data analytics processing 94; transaction processing 95; and video processing and production 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   identifying a physical address, wherein the physical address corresponds to a page;
   detecting a creation of a first process;
   determining that the first process has a copy-on-read configuration implemented for the page;
   determining that the first process is not expected to write to the page; and
   establishing, in response to the determining that the first process has a copy-on-read configuration and the determining that the first process is not expected to write to the page, a first logical address of the page, wherein the first logical address corresponds to the first process and is different than a second logical address of the page corresponding to a second process, and wherein the first logical address and the second logical address map to the physical address.

2. The method of claim 1, wherein the first process is a child process of the second process.

3. The method of claim 2, wherein the first process is an application and the second process is an operating system.

4. The method of claim 2, wherein the first process is an operating system and the second process is a hypervisor.

5. The method of claim 1, wherein the first process and second process are child processes of a third process.

6. The method of claim 1, wherein the first process and second process are operating systems.

7. The method of claim 1, wherein the first process and the second process are applications.

8. The method of claim 1, wherein the copy-on-read configuration is set for all pages referenced by the first process.

9. The method of claim 1, wherein copy-on-read configuration is set for all pages within a block of memory.

10. The method of claim 1, wherein the first process is unaware that the first logical address and the second logical address both map to the physical address.

11. The method of claim 1, wherein a component of the second process is unaware that the first logical address and the second logical address both map to the physical address.

12. The method of claim 1, wherein determining that the first process is not expected to write to the page is an absolute determination.

13. The method of claim 1, wherein determining that the first process is not expected to write to the page is a threshold determination.

14. A system comprising:
   one or more storage-management units;
   a processor; and a memory in communication with the processor, the memory containing program instructions that, when executed by the processor, are configured to cause the processor to perform a method comprising:
- identifying a physical address, wherein the physical address corresponds to a page;
- detecting a creation of a first process;
- determining that the first process has a copy-on-read configuration implemented for the page;
- determining that the first process is not expected to write to the page; and
- establishing, in response to the determining that the first process has a copy-on-read configuration and the determining that the first process is not expected to write to the page, a first logical address of the page, wherein the first logical address corresponds to the first process and is different than a second logical address of the page corresponding to a second process, and wherein the first logical address and the second logical address map to the physical address.

15. The system of claim 14, wherein the first process is a child process of the second process.

16. The system of claim 14, wherein the first process and second process are child processes of a third process.

17. A computer program product, the computer program product comprising a computer readable storage medium having program instructions embodied therewith, the program instructions executable by a computer to cause the computer to:
- identify a physical address, wherein the physical address corresponds to a page;
- detect a creation of a first process;
- determine that the first process has a copy-on-read configuration implemented for the page;
- determine that the first process is not expected to write to the page; and
- establish, in response to the determining that the first process has a copy-on-read configuration and the determining that the first process is not expected to write to the page, a first logical address of the page, wherein the first logical address corresponds to the first process and is different than a second logical address of the page corresponding to a second process, and wherein the first logical address and the second logical address map to the physical address.

18. The computer program product of claim 17, wherein the first process and second process are operating systems.

19. The computer program product of claim 17, wherein the first process is an application and the second process is an operating system.

20. The computer program product of claim 17, wherein the first process is an operating system and the second process is a hypervisor.

* * * * *